Feb. 26, 1946.  J. D. GIVNAN  2,395,476
SCREW
Filed March 25, 1944

James D. Givnan
INVENTOR.

Patented Feb. 26, 1946

2,395,476

UNITED STATES PATENT OFFICE 2,395,476

SCREW

James D. Givnan, Portland, Oreg.

Application March 25, 1944, Serial No. 528,023

5 Claims. (Cl. 85—45)

This invention relates to screws of the recessed-head type in which the recess is characterized by the combination of two elements having the functions of aligning and attaching the screw to the driving bit and of tortionally connecting the screw and the driver, respectively.

The principal object of this invention is the provision in a screw of means to align and attach the screw to the driver in selective degrees of firmness preparatory to and during driving and for the positive engagement thereof by the driver in forceable turning moment.

A second object of the invention is the provision of a recess of such form as may be readily punched or impressed with a punch or die.

A third object of the invention is the provision of a screw-head which may be engaged by an ordinary screw driver as well as a specially formed driver engaging either one or both of the elements of the recess.

Other objects and advantages of this screw will be apparent in the following description wherein the distinguishing features are described and indicated.

Figure 1:
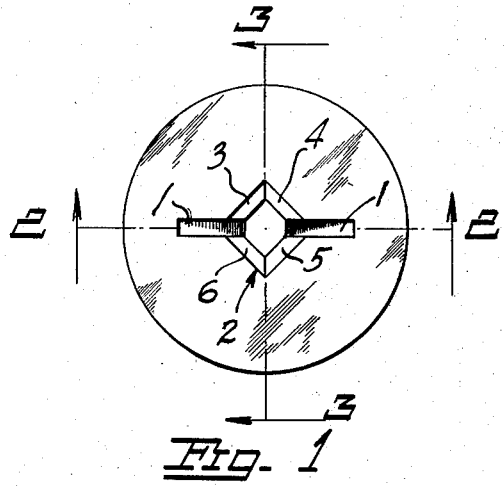
Figure 1 represents a view of the top of the screw.
Figure 2:
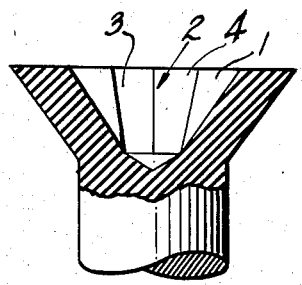
Figure 2 represents a view of a fragmentary diametral section taken on the line 2—2 of Figure 1.
Figure 3:
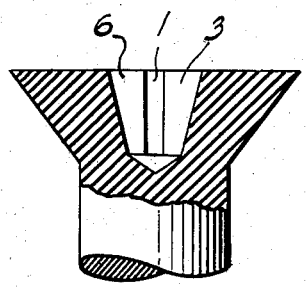
Figure 3 represents a view of a fragmentary diametral section taken on the line 3—3 of Figure 1.

Referring now more particularly to the drawing:

The screw-head recess comprises, a slot 1 disposed diametrally of the screw-head and extending axially with diminishing radial magnitude as indicated in Figure 2; and a socket 2 having mutually inclined walls 3, 4, 5, and 6 disposed symmetrically about the axis of the screw and extending to substantially the same depth as the slot 1.

The recess thus combines a slot 1 extending through a relatively great radial distance, limited by the form of the screw-head, and a centrally disposed pyramidal socket in mutual communication.

The angle of inclination of the socket walls is preferably of the order of that of machine tool centers or variations therefrom as determined by experiment to provide a socket that will be firmly and detachably engaged by a correspondingly formed driver-bit.

The advantages of this screw-head recess are that it may be positively attached to a screw-driver and accurately aligned therewith and as well forcibly engaged at distances sufficiently remote from the axis to assure adequate turning moments. The surfaces engaged by the driver are of relatively great depth and prevent the upsetting of the smooth top surface of the head when heavy turning moments are applied.

It is to be further noticed that the dimensions of the recess are not critical and may vary considerably through wear of production dies without impairing the engagement of either of the recess elements, such variation affecting only the depth to which the driver-bit enters the recess.

I claim:

1. A screw having a recess engageable by a driver, said recess being formed of a centrally disposed socket extending axially of the screw and tapering uniformly throughout its depth, and a diametrically disposed slot communicating with said socket throughout its depth.

2. A recessed-head screw having a recess formed of an axially aligned socket of pyramidal form throughout its depth communicating with a diametrically disposed slot of relatively greater radial extent but terminating within the periphery of the screw head.

3. A recessed-head screw having a recess formed of an axially aligned socket of pyramidal form throughout its depth, and a communicating diametrally disposed uniformly tapering slot of relatively greater radial extent but of the same depth as that of the socket, and said slot terminating within the periphery of the screw head.

4. A recessed-head screw having a recess formed of a diametrally disposed uniformly tapering slot of diminishing radial magnitude and a communicating socket of pyramidal form throughout its depth, a diagonal of said socket being aligned with said slot.

5. A screw having an axially aligned recess comprising four flat uniformly tapering side walls, a diagonal of the recess merging with a diametrally disposed uniformly tapering slot of the same depth as that of the recess.

JAMES D. GIVNAN.